(12) United States Patent
Mori et al.

(10) Patent No.: US 6,242,126 B1
(45) Date of Patent: *Jun. 5, 2001

(54) EXPLOSION-PROOF SEAL PLATE FOR ENCLOSED TYPE CELL AND PRODUCTION METHOD THEREOF

(75) Inventors: Katsuhiko Mori, Hirakata; Yoshihiro Kashihara, Osaka; Yasushi Hirakawa, Moriguchi; Kazuo Saito; Kazuhiko Watanabe, both of Kadoma, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,038
(22) PCT Filed: Oct. 28, 1996
(86) PCT No.: PCT/JP96/03148
§ 371 Date: Jul. 23, 1998
§ 102(e) Date: Jul. 23, 1998
(87) PCT Pub. No.: WO97/16859
PCT Pub. Date: May 9, 1997

(30) Foreign Application Priority Data

Oct. 31, 1995 (JP) ................................................ 7/282762
Jun. 28, 1996 (JP) ................................................ 8/169663

(51) Int. Cl.$^7$ ...................................................... H01M 2/12
(52) U.S. Cl. .............................. 429/53; 429/54; 429/55; 429/56
(58) Field of Search ................................. 429/53, 54, 55, 429/56

(56) References Cited

U.S. PATENT DOCUMENTS 5,427,875   6/1995   Yamamoto et al. .
5,464,705   11/1995   Wainwright .

FOREIGN PATENT DOCUMENTS

| 5-343043 | 12/1993 | (JP) . | |
|---|---|---|---|
| 6-196150 | 7/1994 | (JP) . | |
| 6-203818 | * 7/1994 | (JP) | ................ H01M/2/12 |
| 7-105933 | * 4/1995 | (JP) | ................ H01M/2/12 |

* cited by examiner

Primary Examiner—Carol Chaney
Assistant Examiner—Mark Ruthkosky
(74) Attorney, Agent, or Firm—Ratner & Prestia

(57) ABSTRACT

The present invention relates to an explosion-proof seal plate for a sealed cell and a production method thereof and aims at providing an explosion-proof seal plate and production method thereof, wherein problems of a risk of explosion of a cell due to an excessive pressure inside the cell caused by abnormal generation of a gas through a chemical reaction accompanying over charge or erroneous use of the cell or damaging of electronic equipment using the cell as the power source are solved, ignition and other accidents can be prevented with a high accuracy by reliably cutting off an electric current when the cell internal pressure increases, and the increase in the resistance due to permeation of an electrolyte can be limited. In order to accomplish this aim, the present invention provides a thin portion 7a having a breaking strength of 18–24 kg/cm$^2$ in the central portion of an upper metallic foil 7 made of aluminum and a thin portion 8a having a breaking strength of 10–13 kg/cm$^2$ in the central portion of a lower metallic foil 8 made of aluminum, wherein the diameter A of the thin portion 7a of the upper metallic foil and the diameter B of the thin portion 8a of the lower metallic foil 8 satisfy the relation AB. The two metallic foils are welded at the central portions with an insulating gasket interposed, and encased in a metallic case 4 made of aluminum having 4 vent holes, on top of which a temperature dependent resistor 5 and a metallic cap 6 having 4 vent holes are then placed. A seal plate is obtained by sealing the periphery of the metallic case 4, with which it is possible to prevent accidents such as ignition and explosion of a cell by reliably allowing internal gas to exhaust in the event of generation of a large volume of gas under an abnormal condition of a sealed cell.

6 Claims, 5 Drawing Sheets

EXPLOSION-PROOF SEAL PLATE FOR ENCLOSED TYPE CELL AND PRODUCTION METHOD THEREOF

TECHNICAL FIELD OF THE INVENTION

This invention relates to explosion-proof top assemblies for sealed cells to be used in sealing sealed cells, especially high energy density cells such as lithium secondary cells, and their method of producing.

BACKGROUND OF THE TECHNOLOGY

In recent years, there has been rapid progress in portable and/or cordless designs of audiovisual equipment, personal computers and other electronic equipment. As the power supply for these electronic equipment, high capacity type of non-aqueous electrolyte secondary batteries such as represented by various alkaline storage batteries and lithium secondary batteries are suitable. These non-aqueous electrolyte secondary batteries are desired to be implemented as sealed batteries with a high energy density and with superior load characteristics.

On the other hand, sealed batteries with a high energy density tend to generate abnormal gas inside the cells due to chemical reaction resulting from troubles in associated equipment including the charger or from over charge or erroneous use, thus causing an excessive pressure inside cells, explosion of cells, or damage to the electronic equipment using the cells as the power supply.

In order to prevent these accidents, these types of cells have hitherto been equipped with a safety device against explosion to allow gas to exhaust by opening a vent when the cell internal pressure exceeds a preset value. Furthermore, as non-aqueous electrolyte secondary batteries have a danger of ignition due to a rapid temperature rise, they are equipped with a reliable safety mechanism against explosion which will completely cut off electric current prior to exhausting gas by detecting the internal pressure.

As an example, in Japanese Laid-Open Patent No. Hei 6-196150, a mechanism is disclosed wherein a vent on top of a cell and a terminal plate having a vent hole are made electrically conductive through their central welded section, and when the internal pressure rises to a predetermined value, the vent which is exerted with the pressure through the vent hole of the terminal plate will be detached from the section welded with the terminal plate by an outwardly deforming stress due to the pressure through the vent hole of the terminal plate, thereby cutting off an electric current.

In the above-described explosion-proof safety mechanism, ultrasonic welding which is capable of welding to a low weld strength is employed in welding the vent and the terminal plate because of the necessity of welding necessary portions of the vent and the terminal plate to a weld strength low enough to allow detachment at a certain internal pressure. However, since ultrasonic welding causes fusion by vibration heating only on the surface of the work piece, there is a possibility of causing a large dispersion in the weld strength.

Consequently, in the above-described explosion-proof safety mechanism, as the pressure of cutting off an electric current is determined dependent on the weld strength of the welded portion, the pressure of cutting off an electric current varies with the variability of the weld strength, exhibiting a drawback of not being able of setting to a fixed value. As a result, it suffers problems of cutting off an electric current before the cell internal pressure rises to a predetermined value, or not cutting off an electric current even when the cell internal pressure has risen to a predetermined value.

Therefore, a higher-accuracy method of cutting off an electric current has become necessary which is not affected by the weld strength in cutting off an electric current.

DISCLOSURE OF THE INVENTION

It is the object of this invention to provide an explosion-proof seal plate for a sealed cell and a production method thereof which can prevent with a high accuracy accidents such as ignition by cutting off an electric current without fail in the event of an increase in cell internal pressure and can limit the increase in resistance due to permeation of an electrolyte.

In order to attain the object, this invention comprises an upper metallic foil and a lower metallic foil disposed one on top of the other, wherein the two metallic foils are so constructed as to be electrically connected in sections encircled by concentric rings of thin portions, the breaking strength of the thin portion of the lower metallic foil is smaller than the breaking strength of the thin portion of the upper metallic foil, and the diameter of the concentric thin portion of the upper metallic foil is made larger than the diameter of the concentric thin portion of the lower metallic foil. The invention also comprises two elastic metallic foils, upper and lower, disposed one on top of the other, wherein the upper metallic foil is provided with a central concave portion swelling downward and the lower metallic foil is provided with a central convex portion swelling upward and an easy-to-break portion of which the breaking strength is set at a value at which it breaks when the cell internal pressure rises to a predetermined value, the periphery of each of the two metallic foils is fixed with an insulating gasket interposed and the two metallic foils are electrically connected by welding the tip of the concave portion and the tip of the convex portion. Consequently, with this invention, when the cell internal pressure rises to a value predetermined by the breaking strength of the easy-to-break portion of the lower metallic foil, the easy-to-break portion will break thereby causing the lower metallic foil and the upper metallic foil to separate from each other thus cutting off an electric current flowing through the connecting section of the two metallic foils.

As the pressure at which an electric current is to be cut off is determined by the breaking strength of the easy-to-break portion, it is not necessary to cause the connecting section of the two metallic foils to be detached by cell internal pressure as has heretofore been practiced, making it possible to firmly weld the connecting section by laser welding and the like.

Also, in welding the two metallic foils, when the peripheries of both metallic foils are placed one on top of the other with an insulating gasket interposed, the central concave portion of the upper metallic foil swelling downward and the central convex portion of the lower metallic foil swelling upward are elastically brought into contact, thus leaving no gap between the concave portion and the convex portion without using any jig or other auxiliary means, and allowing a defect-free laser welding at all times.

The method of producing an explosion-proof seal plate (hereinafter called "seal plate") for a sealed cell of the present invention comprises a process of disposing one on top of the other and opposite to each other an upper elastic metallic foil provided with a central concave portion swelling downward and a lower elastic metallic foil provided with an easy-to-break portion provided on a central convex portion swelling upward, a process of pressing with each other the tips of the concave portion and the convex portion by disposing the peripheries of the two metallic foils one on top of the other with an insulating gasket interposed which gasket having a thickness smaller than the sum of the thicknesses of the swelling of each of the metallic foils from respective periphery, a process of fixing peripheries of the two metallic foils by holding them from the top and the bottom with a fixing jig, and a process of welding by laser welding the tips of the concave portion and the convex portion which are in contact with each other, thereby forming a connecting section. With this invention, as the periphery of each of the two metallic foils is placed one on top of the other with an insulating gasket interposed having a thickness smaller than the sum of the thicknesses of the concave swelling and the convex swelling from the respective peripheries, the tips of the concave portion and the convex portion are brought into contact with each other, and as the metallic foils are slightly bent causing the portion in contact strongly pressed due to elasticity, the tips of the concave portion and the convex portion are made in secure contact without any gap thus assuring defect-free laser welding at all times.

Accordingly, with this invention, when cutting off an electric current by an increase in the internal pressure of a cell, it is possible not only to cut off an electric current with a high precision without being affected by the weld strength but also to reliably exhaust the internal gas without fear of closing the vent holes on the upper metallic foil with the lower metallic foil when a large volume of gas is generated, thereby being able to prevent accidents such as ignition, explosion, etc. It is also possible to greatly reduce the permeation of an electrolyte in the cell into a temperature dependent resistor and to limit the internal resistance of the seal plate.

PREFERABLE MODE FOR CARRYING OUT THE INVENTION

Referring to drawings, exemplary embodiments of the present invention will be described in the following.

First Exemplary Embodiment

Figure 1:
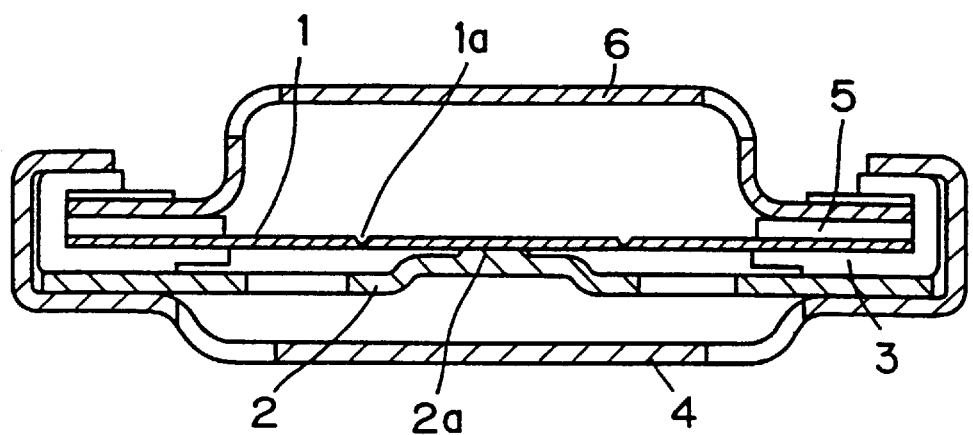
FIG. 1 is a cross sectional view of a seal plate in the first exemplary embodiment of the present invention.

FIG. 1 shows the construction of a seal plate in accordance with the first exemplary embodiment of the present invention, wherein a thin portion 1$a$ is provided in the central portion of an upper metallic foil 1 made of aluminum with a thickness of 0.15 mm and a diameter of 12.7 mm using a C-shaped stamping die having a diameter of 4.0 mm, a protrusion 2$a$ with a diameter of 1.0 mm is provided in the center of a lower metallic foil 2 made of aluminum with a thickness of 0.3 mm and a diameter of 13.5 mm and having 4 vent holes of 1.5 mm diameter, and the two metallic foils were welded by ultrasonic welding at the central portion of the upper metallic foil 1 and the protrusion 2$a$ of the lower metallic foil 2 with an insulating gasket 3 interposed. They were then encased in a metallic case 4 made of aluminum and having 4 vent holes of 1.5 mm diameter, a temperature dependent resistor 5 and a metallic cap 6 having 4 vent holes of 1.5 mm diameter were placed on top of it, and then the periphery of the metallic case 4 was sealed to obtain a seal plate.

Second Exemplary Embodiment

Figure 2:
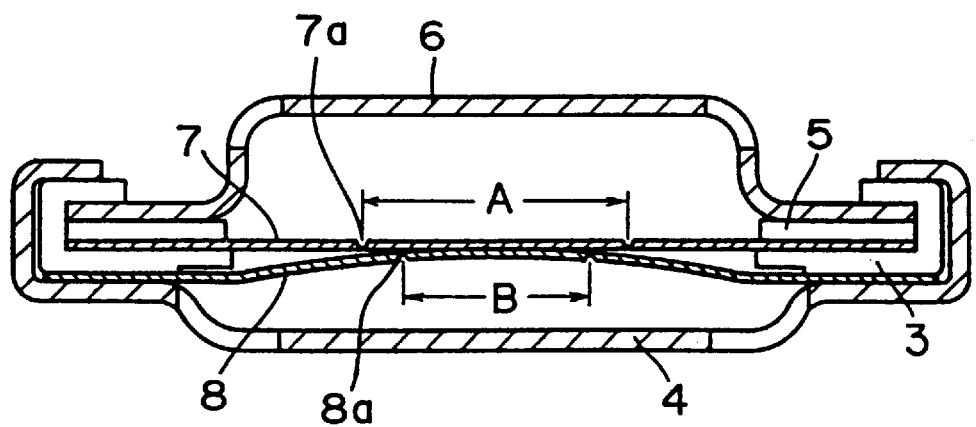
FIG. 2 is a cross sectional view of a seal plate in the second exemplary embodiment of the present invention.

FIG. 2 shows the construction of a seal plate in accordance with the second exemplary embodiment of the present invention, wherein a thin portion 7$a$ is provided in the central portion of an upper metallic foil 7 made of aluminum with a thickness of 0.10 mm and a diameter of 12.7 mm using a C-shaped stamping die having a diameter of 4.0 mm, a thin portion 8$a$ is provided on a lower metallic foil 8 made of aluminum with a thickness of 0.10 mm and a diameter of 13.5 mm and having 4 vent holes of 1.5 mm diameter using an O-shaped stamping die having a diameter of 2.5 mm, and the two metallic foils were welded by ultrasonic welding at the central portions of the two metallic foils with an insulating gasket 3 interposed. Here the breaking strength of the thin portion 8$a$ of the lower metallic foil 8 was 10–13 kg/cm$^2$ while the breaking strength of the thin portion 7$a$ of the upper metallic foil 7 was 18–24 kg/cm$^2$. They were then encased in a metallic case 4 made of aluminum and having 4 vent holes of 1.5 mm diameter, covered with a metallic cap 6 which has 4 vent holes of 1.5 mm diameter, and then the periphery of the metallic case 4 was sealed to obtain a seal plate. The thin portions 7$a$ and 8$a$ were so formed as to satisfy the relation AB where A is the diameter of the central portion encircled by the thin portion 7$a$ provided on the upper metallic foil 7 and B is the diameter of the central portion encircled by the thin portion 8$a$ provided on the lower metallic foil 8.

Third Exemplary Embodiment

Figure 3:
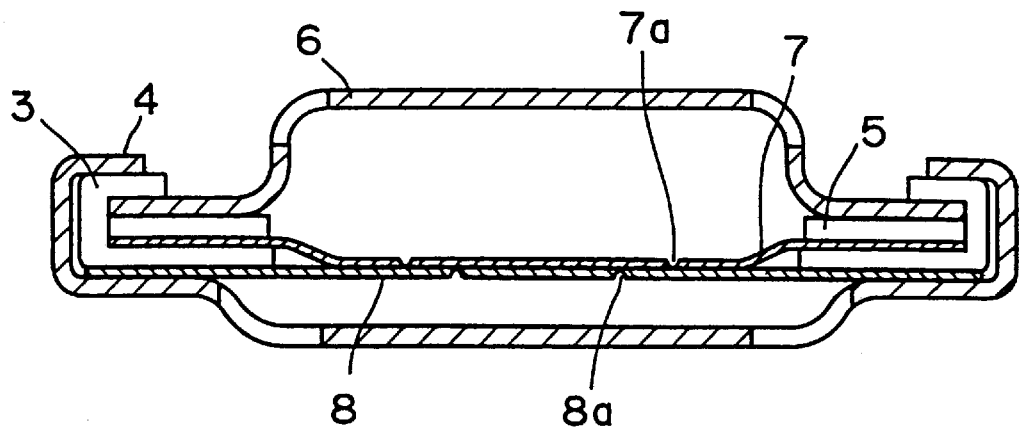
FIG. 3 is a cross sectional view of a seal plate in the third exemplary embodiment of the present invention.

FIG. 3 shows the construction of a seal plate in accordance with the third exemplary embodiment of the present invention, wherein a thin portion 7$a$ is provided in the central portion of an upper metallic foil 7 made of aluminum with a thickness of 0.10 mm and a diameter of 12.7 mm by using a C-shaped stamping die having a diameter of 4.0 mm, the central portion of the upper metallic foil 7 is made lower by 0.5 mm below its peripheral in the form of a reversed trapezoid, a thin portion 8$a$ is provided on a lower metallic foil 8 made of aluminum with a thickness of 0.10 mm and a diameter of 13.5 mm and having 4 vent holes of 1.5 mm diameter using an O-shaped stamping die having a diameter of 2.5 mm, an insulating gasket 3 was interposed between the peripheries of the two metallic foils, and the central portion in the form of a reversed trapezoid of the upper metallic foil 7 and the central portion of the lower metallic foil were welded. They were then encased in a metallic case 4 made of aluminum and having 4 vent holes of 1.5 mm diameter, a temperature dependent resistor 5 and a metallic cap 6 having 4 vent holes of 1. 5 mm diameter were placed on top of it, and then the periphery of the metal case 4 was sealed to obtain a seal plate.

Fourth Exemplary Embodiment

Figure 4:
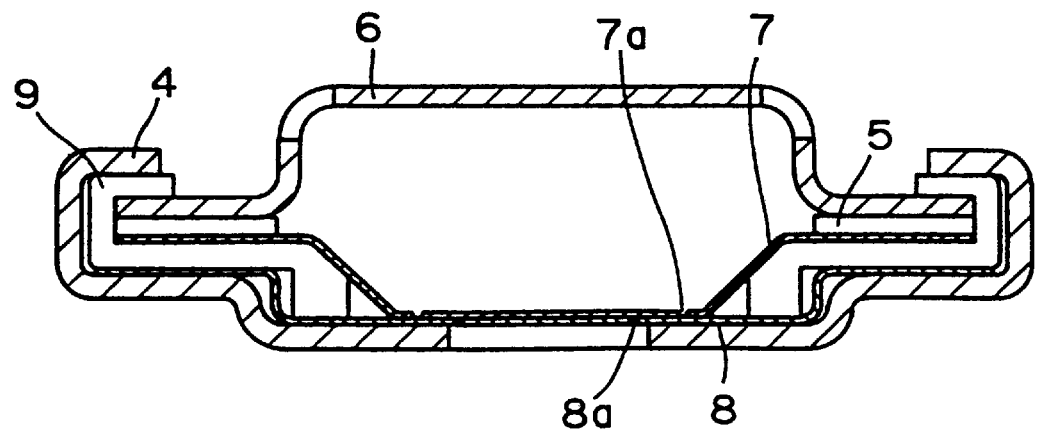
FIG. 4 is a cross sectional view of a seal plate in the fourth exemplary embodiment of the present invention.

FIG. 4 shows the construction of a seal plate in accordance with the fourth exemplary embodiment of the present invention, wherein a thin portion 7a is provided in the central portion of an upper metallic foil 7 made of aluminum with a thickness of 0.10 mm and a diameter of 12.7 mm by using a C-shaped stamping die having a diameter of 4.0 mm, the central portion of the upper metallic foil 7 is made lower by 1.20 mm below the peripheral in the form of a reversed trapezoid, a thin portion 8a is provided on a lower metallic foil 8 made of aluminum with a thickness of 0.10 mm and a diameter of 13.5 mm and having 4 vent holes of 1.5 mm diameter using an O-shaped stamping die having a diameter of 2.5 mm, the central portion of the lower metallic foil 8 is made concave to a depth of 0.7 mm from its peripheral, a burring-processed shape or like insulating gasket 9 is interposed between the peripheries of the two metallic foils, and the central portion of each of the metallic foils was welded together. They were then encased in a metallic case 4 made of aluminum having a vent hole of 3.0 mm diameter on the bottom, a temperature dependent resistor 5 and a metallic cap 6 having 4 vent holes of 1.5 mm diameter were placed on top of it, and then the periphery of the metallic case 4 was sealed to obtain a seal plate.

Fifth Exemplary Embodiment

Figure 5:
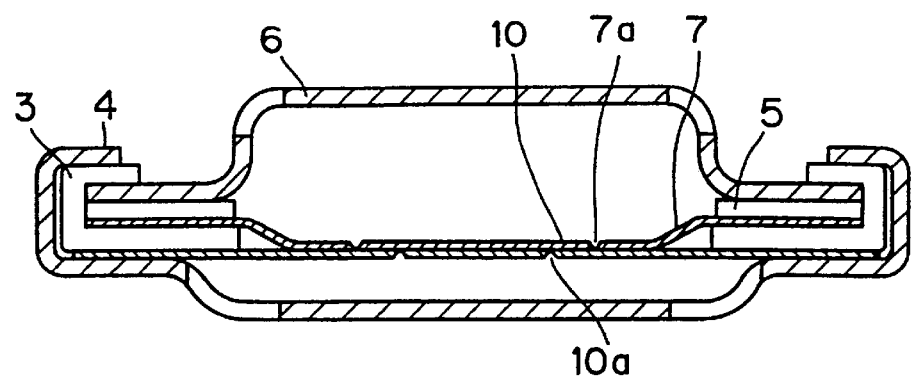
FIG. 5 is a cross sectional view of a seal plate in the fifth exemplary embodiment of the present invention.

FIG. 5 shows the construction of a seal plate in accordance with the fifth exemplary embodiment of the present invention, wherein a thin portion 7a is provided in the central portion of an upper metallic foil 7 made of aluminum with a thickness of 0.10 mm and a diameter of 12.7 mm by using a C-shaped stamping die having a diameter of 4.0 mm, the central portion of the upper metallic foil 7 is made lower by 0.5 mm below its peripheral in the form of a reversed trapezoid, a thin portion 10a is provided on a lower metallic foil 10 made of aluminum with a thickness of 0.10 mm and a diameter of 13.5 mm and having no vent holes using an O-shaped stamping die having a diameter of 2.5 mm, an insulating gasket 3 is interposed between the peripheries of the two metallic foils, and the central portion recessed in the form of a reversed trapezoid of the upper metallic foil 7 and the central portion of the lower metallic foil 10 were welded together. They were then encased in a metallic case 4 made of aluminum and having 4 vent holes of 1.5 mm diameter, a temperature dependent resistor 5 and a metallic cap 6 having 4 vent holes of 1.5 mm diameter were placed on top of it, and then the periphery of the metallic case 4 was sealed to obtain a seal plate.

Figure 6:
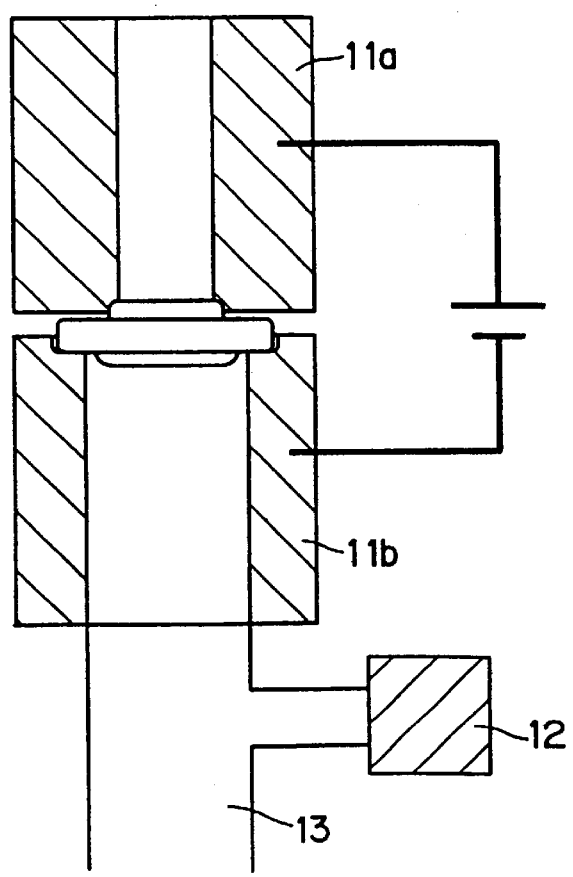
FIG. 6 is a schematic cross sectional view of an apparatus for evaluation of the pressure to cut off an electric current.

Subsequently, using an evaluation apparatus as shown in FIG. 6, a high-pressure air was applied through a high-pressure air inlet 13 to the bottom of the metallic case 4 of each of the top assemblies described in the first to fifth exemplary embodiments while increasing the pressure at a rate of 0.6 kg/cm$^2$/sec, and the pressure of the high-pressure air at which the electric current flowing to the cap 6 was cut off was measured using a pressure sensor 12. Table 1 shows the results obtained. In FIGS. 6, 11a and 11b represent electrodes.

TABLE 1

|  | 1st Emb. | 2nd Emb. | 3rd Emb. | 4th Emb. | 5th Emb. |
|---|---|---|---|---|---|
| Current Cut-off Pressure | 12.5 | 11.5 | 11.8 | 11.5 | 12.5 |
|  | 10.8 | 11.5 | 12.5 | 10.9 | 10.9 |
|  | 13.5 | 10.5 | 12.7 | 12.0 | 11.5 |
|  | 9.8 | 11.0 | 12.0 | 11.9 | 12.3 |

TABLE 1-continued

|  | 1st Emb. | 2nd Emb. | 3rd Emb. | 4th Emb. | 5th Emb. |
|---|---|---|---|---|---|
|  | 11.5 | 12.3 | 11.7 | 12.4 | 12.8 |
|  | 10.7 | 11.9 | 12.1 | 11.3 | 13.1 |
|  | 10.3 | 13.2 | 11.4 | 12.8 | 12.5 |
|  | 10.5 | 11.8 | 12.6 | 12.7 | 11.6 |
|  | 8.7 | 12.7 | 10.9 | 12.5 | 12.8 |
|  | 11.2 | 11.9 | 11.8 | 11.3 | 11.7 |
| $\bar{x}$ | 11.0 | 11.8 | 11.9 | 11.9 | 12.2 |
| $\sigma (n-1)$ | 1.28 | 0.74 | 0.53 | 0.63 | 0.65 |

The top assemblies obtained in each embodiment were also installed in lithium secondary batteries employing a non-aqueous electrolyte. After storing these batteries at 85° C. for 3 weeks, internal resistance of the top assemblies was measured at room temperature, the results of which being shown in Table 2.

TABLE 2

|  | 1st Emb. | 2nd Emb. | 3rd Emb. | 4th Emb. | 5th Emb. |
|---|---|---|---|---|---|
| Resistance Value | 113 | 114 | 118 | 115 | 102 |
|  | 115 | 114 | 110 | 119 | 103 |
|  | 116 | 115 | 118 | 112 | 100 |
|  | 118 | 112 | 119 | 118 | 111 |
|  | 114 | 111 | 120 | 120 | 99 |
|  | 112 | 113 | 121 | 115 | 105 |
|  | 113 | 115 | 117 | 114 | 104 |
|  | 111 | 120 | 116 | 113 | 103 |
|  | 109 | 118 | 115 | 110 | 103 |
|  | 107 | 117 | 116 | 117 | 102 |
| $\bar{x}$ | 113 | 115 | 117 | 115 | 103 |
| $\sigma (n-1)$ | 3.09 | 2.62 | 2.93 | 3.03 | 3.09 |

As is clear from Tables 1 and 2, it is possible to reduce the dispersion of electric current cut-off pressure by using the top assemblies in accordance with the present invention and to limit the increase in internal resistance of the seal plate.

Sixth Exemplary Embodiment:

As described above, the top assemblies in the above First to Fifth Exemplary Embodiments exhibit a remarkable safety against explosion. Generally, laser welding can be performed without any difficulty when the work piece is rigid or thick enough. However, as the metallic foils used in top assemblies are as thin as 0.05 to 0.20 mm in thickness and are easy to be deformed, when welding them by laser welding, it is not possible to directly hold the portions of the two metallic foils to be welded even when using a fixing jig to fix the two metallic foils, and a gap tends to be formed due to deformation on the portion to be welded, resulting in a possibility of defect in welding.

Figure 7:
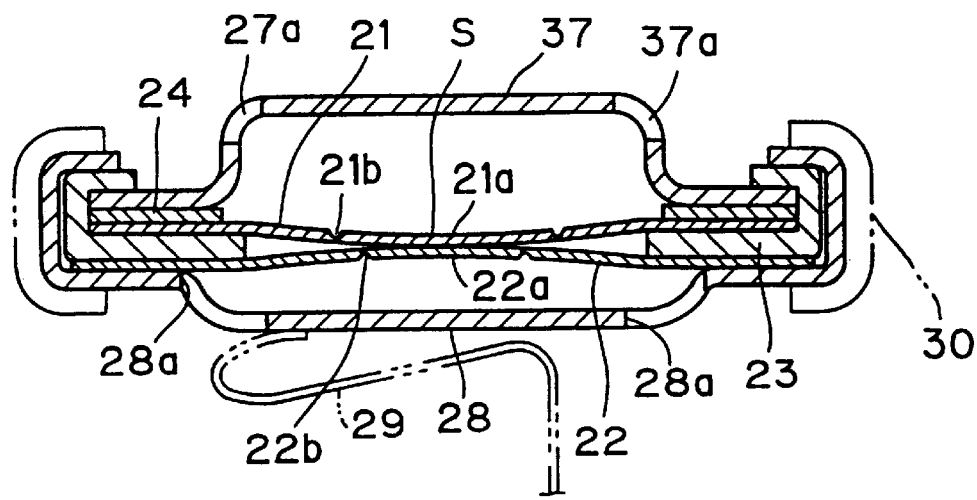
FIG. 7 is a cross sectional view of a seal plate in the sixth exemplary embodiment of the present invention.

This exemplary embodiment has been added as a sixth exemplary embodiment of the present invention to further improve the performance of the top assemblies described in the First to the Fifth Exemplary Embodiments. As shown in FIG. 7, it comprises a thin elastic upper metallic foil 21, an elastic lower metallic foil 22 disposed opposite the upper metallic foil 21, a ring-shaped insulating gasket 23 interposed between the periphery of each of the two metallic foils 21 and 22, a ring-shaped PTC (positive temperature coefficient device 24 placed on the periphery of the upper metallic foil 21, a metallic cap 27 placed on top of the PTC device 24 and having 4 vent holes 27a, and a metallic case 28 having 4 vent holes 28a made of aluminum into which the above-mentioned components are to be encased and fixed.

The upper metallic foil 21 consists of an aluminum disc having, as an example, a thickness of 0.15 mm and a diameter of 12.7 mm, and is provided with a central concave portion 21a swelling downward in a curved configuration and a large diameter easy-to-break portion 21b comprising a C-shaped thin portion formed in the central portion of the concave portion 21a by using, for example, a C-shaped stamping die having a diameter of 4.0 mm. The lower metallic foil 22 consists of an aluminum disc having, as an example, a thickness of 0.1 mm and a diameter of 13.5 mm, and is provided with a central convex portion 22a swelling upward in a curved configuration and a small diameter easy-to-break portion 22b comprising an O-shaped thin portion formed in the central portion of the convex portion 22a by using, for example, an O-shaped stamping die having a diameter of 2.5 mm.

The two metallic foils 21 and 22 are so disposed as the large diameter easy-to-break portion 21b and the small diameter easy-to-break portion 22b concentrically face together with the small diameter easy-to-break portion 22b positioned inside the large diameter easy-to-break portion 21b. The central portion of the concave portion 21a and the central portion of the convex portion 22a are welded together by laser welding while being pressed to form a connecting section S. The above-mentioned PTC device 24 is a positive temperature coefficient resistor of which the electrical resistance drastically increases in the event its temperature rises beyond a predetermined value due to flowing of an electric current exceeding a designed value.

The seal plate in accordance with this exemplary embodiment is encased in the metallic case 28 with the PTC device 24 and the metallic cap 27 placed on top of the two metallic foils 21 and 22 disposed one on top of the other with an insulating gasket 23 interposed, followed by inward caulking of the upper peripheral of the metallic case 28. In inserting the seal plate into a cell can, a lead wire 29 coming from one of the electrode plate groups, normally positive electrode plate group, housed in the cell can is connected to the metallic case 28 by welding. After pouring an electrolyte into the groups of electrode plates inside the cell can, the seal plate is installed inside an opening of the cell can with an insulating gasket 30 provided around the seal plate. Then, by inwardly caulking the upper end of the cell can, the opening of the cell can is sealed by the seal plate.

In a sealed cell assembled in this way, an electric current flows from the electrode plate (not shown in drawings) passing through the lead wire 29, the metallic case 28, the lower metallic foil 22, the connecting section S, the upper metallic foil 21, the PTC device 24, and to the metallic cap 27 thus functioning as a cell. In a sealed cell employing a seal plate in accordance with the present invention, the explosion-proof safety function acts in 3 steps.

To begin with, the first explosion-proof safety function will be described. In the event an excess electric current flows in a cell, temperature of the PTC device 24 rises to its operating temperature in a short period of time causing an increase in the resistance, and causing the flowing electric current to be greatly reduced and maintaining it at a reduced level. This way, remarkable damages of the cell due to short-circuiting in external circuits or erroneous use such as allowing an excess electric current can be prevented.

Next, the second explosion-free safety function will be described. In secondary lithium cells, when over charge or reverse charge under an uncontrolled condition occurs such as due to failure of the charger, or over discharge of many cells connected in series occurs, even though the electric current is below the operating current of the above-mentioned PTC device 24, the allowable electrical capacity of the cell may often be exceeded and the cell internal pressure may increase. In such cases, if an electric current continues to flow in the cell, the cell temperature may rapidly rise with the accompanying decomposition of the electrolyte and the active materials, thus generating a large volume of gas or vapor, resulting in ignition or explosive damages. It is therefore necessary to detect the cell internal pressure and to activate explosion-proof safety functions which will completely cut off an electric current in order to prevent ignition or explosive damages.

Figure 8:
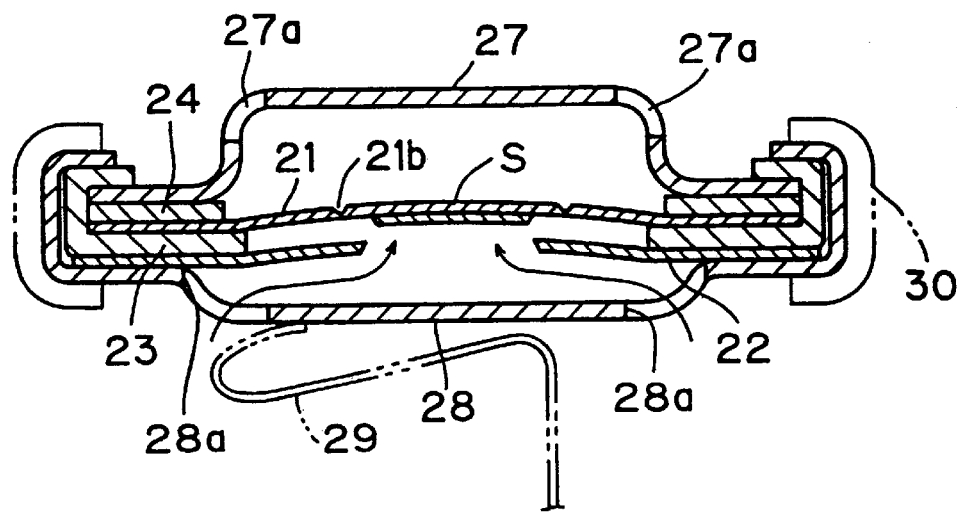
FIG. 8 is a cross sectional view showing the seal plate of FIG. 7 in operation.

With the present invention, when the cell internal pressure rises to a value predetermined by the breaking strength of the small diameter easy-to-break portion 22b, the small diameter easy-to-break portion 22b is caused to break, thus causing the portion inside the small diameter easy-to-break portion 22b provided on the lower metallic foil 22 to be removed as shown in FIG. 8 and is detached from the lower metallic foil 22 together with the upper metallic foil 21, thereby separating the metallic foils 21 and 22 which have been electrically conductive through the connecting section S and cutting off the electric current. Here, as the pressure to cut off an electric current does not vary dependent on the weld strength of the connecting section S as in conventional top assemblies, an electric current can be cut off with a high accuracy at the time the cell internal pressure rises to a predetermined value. Also, as the upper metallic foil 21 keeps its shape when an electric current is cut off, leakage of an electrolyte to outside is prevented thus avoiding such accidents as adhesion of electrolyte on the PTC device 24 or corrosion of other equipment by leaking electrolyte caused by opening of a breaking vent as in conventional top assemblies.

In the event the cell internal pressure further continues to increase, the third explosion-proof safety function of the seal plate of the present invention starts to work. When the cell internal pressure rises to a value predetermined by the breaking strength of the large diameter easy-to-break portion 21b due to generation of a large volume of gas or vapor, the large diameter easy-to-break portion 21b is caused to break thereby breaking the central portion of the upper metallic foil 21 and exhausting the filled gas to outside of the cell. Here, as the two metallic foils 21 and 22 are welded with the small diameter easy-to-break portion 22b positioned concentrically within the large diameter easy-to-break portion 21b, the portion of the lower metallic foil 22 which is attached to the upper metallic foil 21 will not close the opening produced by the breakage of the large diameter easy-to-break portion 21b of the upper metallic foil 21, and the internal gas can be smoothly exhausted to outside even in the case of generation of a large volume of gas.

Figure 9:
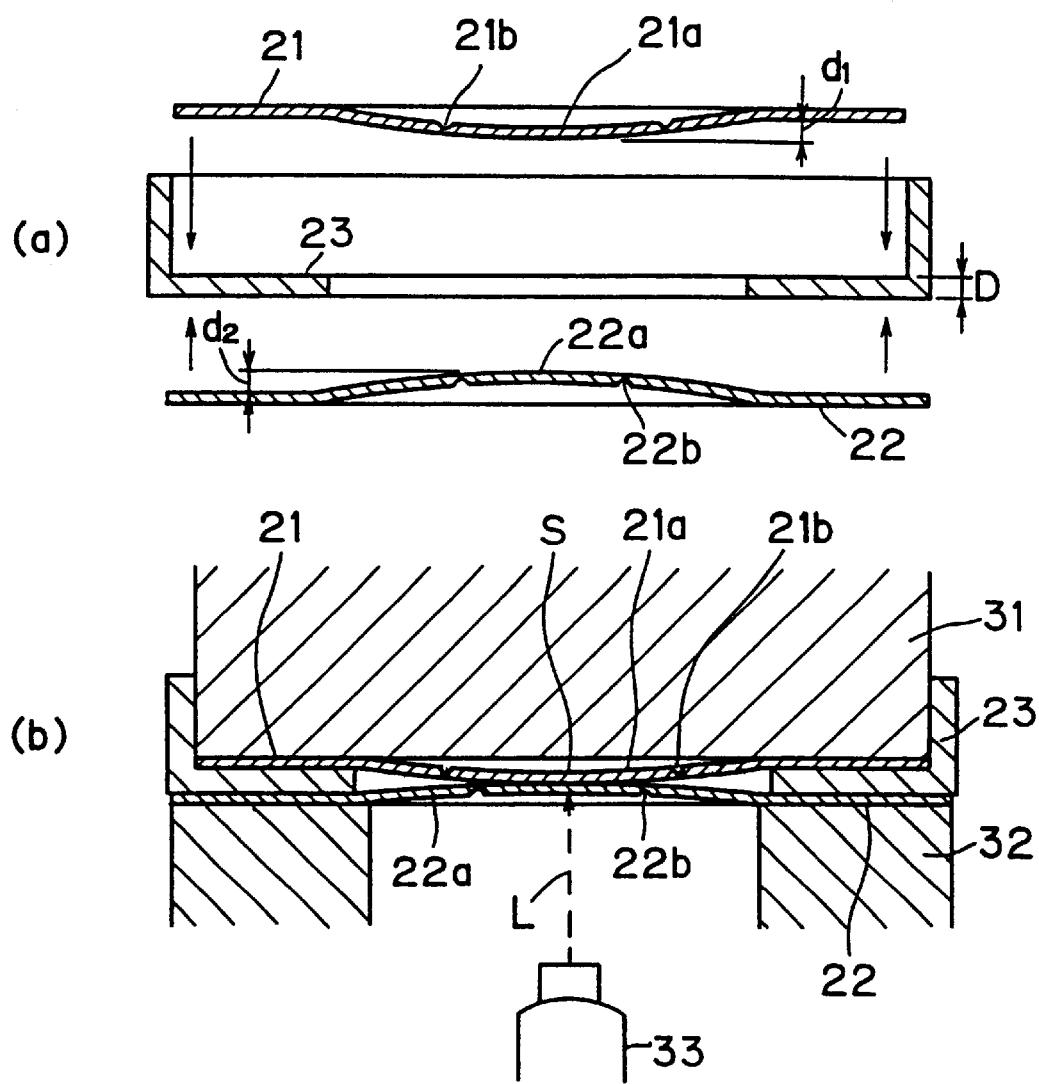
FIG. 9($a$) and FIG. 9($b$) show cross sectional views of partial processes of producing the seal plate of FIG. 7.

The features of the seal plate of the present invention lies in that, as the electric current cut-off pressure is controlled by the breaking strength of the small diameter easy-to-break portion 22b, the connecting section S of the two metallic foils 21 and 22 can be firmly welded by laser welding and the like. Now, the method of forming the connecting section S will be described referring to FIG. 9. In FIG. 9(a), supposing that the distance between the lower surface of the flat periphery of the upper metallic foil 21 and the tip of the concave portion 21a to be $d_1$, the distance between the upper surface of the flat periphery of the lower metallic foil 22 and the tip of the convex portion 22a to be $d_2$, and the thickness of the insulating gasket 23 to be D, these distances are set to satisfy the relation $d_1+d_2>D$.

As shown in FIG. 9(b), in forming the connecting section S between the upper metallic foil 21 and the lower metallic foil 22, the peripheries of the two metallic foils 21 and 22 are firmly held and fixed with fixing jigs 31 and 32 with the insulating gasket 23 interposed. During this process, as is clear from the above-mentioned dimensional relation of $d_1+d_2>D$, the tip of the concave portion 21a of the upper metallic foil 21 and the tip of the convex portion 22a of the lower metallic foil 22 are brought into contact with each other, subsequently causing them to be slightly warped while being firmly pressed with each other without leaving any gap in the sections in contact. By irradiating the sections in contact with a laser beam L from a laser welding machine 33, the connecting section S which has a large weld strength can be formed with a good yield without any welding defect or perforation.

In the above-described exemplary embodiment, as the breaking strength of the easy-to-break portion of the lower metallic foil of the seal plate can be set based the internal pressure of the cell caused by the gas generated in the event of an abnormal operation, when the internal pressure rises to a predetermined value, the lower metallic foil and the upper metallic foil are separated by the breakage of the easy-to-break portion, thereby cutting off an electric current and reliably preventing accident such as ignition and also limiting an increase in resistance of the seal plate due to permeation of electrolyte.

INDUSTRIAL APPLICATION

As has been described above, according to the explosion-proof seal plate for sealed cells and production method thereof of the present invention, the seal plate comprises an upper elastic metallic foil and a lower elastic metallic foil disposed one on top of the other, wherein the two metallic foils are electrically connected at the sections encircled by thin portions concentrically provided on each metallic foil, the breaking strength of the thin portion of the lower metallic foil is made smaller than the breaking strength of the thin portion of the upper metallic foil, and the diameter of the concentric thin portion of the upper metallic foil is made larger than the diameter of the concentric thin portion of the lower metallic foil. Furthermore, the upper metallic foil is provided with a central concave portion swelling downward and the lower metallic foil is provided with a central convex portion swelling upward and with an easy-to-break portion which is designed to break when the cell internal pressure rises to a predetermined value, and the periphery of each of the two metallic foils is fixed with a ring-shaped insulating gasket interposed and the tip of the concave portion and the tip of the convex portion are made electrically conductive by bringing them in contact under a pressure. By adopting this construction, when the cell internal pressure rises to a value predetermined by the breaking strength of the easy-to-break portion of the lower metallic foil, the lower metallic foil and the upper metallic foil are separated by breakage of the easy-to-break portion, thus cutting off an electric current flowing through the connecting section of the two metallic foils and reliably exhausting an internal gas in the event of generation of a large volume of a gas, thereby preventing accidents such as ignition, explosion, etc., of the cell. It is also possible to greatly reduce permeation of the electrolyte in the cell into a temperature dependent resistor thereby limiting an increase in the internal resistance of the seal plate.

What is claimed is:

1. An explosion-proof seal plate for a sealed cell comprising an upper metallic foil and a lower metallic foil disposed one above the other, wherein said two metallic foils have a structure electrically connected at sections enclosed by their respective concentrically formed thin portions, the breaking strength of the thin portion of the lower metallic foil is smaller than the breaking strength of the thin portion of the upper metallic foil, the breaking strength of the thin portion of the upper metallic foil is smaller than the breaking strength of the connecting section, and the diameter of the concentric thin portion of the upper metallic foil is larger than the diameter of the concentric thin portion of the lower metallic foil.

2. An explosion-proof seal plate for a sealed cell comprising an elastic upper metallic foil and an elastic lower metallic foil disposed one above the other, wherein said upper metallic foil is provided with a central concave portion swelling downward, said lower metallic foil is provided with a central convex portion swelling upward and with an easy-to-break portion the breaking strength of which being set at a value to break when the cell internal pressure rises to a predetermined value, said central concave portion and said central convex portion are elastic, said elasticity causing said concave portion and convex portions to press against each other, the periphery of each of said two metallic foils is fixed with a ring-shaped insulating gasket interposed, said two metallic foils are brought into contact under a pressure at the tip of the concave portion of said upper metallic foil and at the tip of the convex portion of said lower metallic foil and are made electrically conductive via a connecting section formed by welding the portions in contact under a pressure.

3. Production method of an explosion-proof seal plate for a sealed cell comprising a process of disposing opposite to each other and one above the other an elastic upper metallic foil provided with a central concave portion swelling downward and an elastic lower metallic foil provided with an easy-to-break portion at a central convex portion swelling upward, a process of pressing together tips of said concave portion and said convex portion by placing one on top of the other periphery of each of said metallic foils with an insulating gasket interposed which has a thickness smaller than the sum of the distances from the respective periphery to the tip of the concave portion and to the tip of the convex portion, a process of pressing together the tips of the concave portion and the convex portion using the elasticity, a process of fixing peripheries of said two metallic foils by holding with a fixing jig from the top and from the bottom, and a process of forming a connecting section by laser welding of the tip of each of said concave portion and said convex portion which are in contact with each other.

4. The explosion-proof seal plate of claim 1, additionally comprising a temperature dependent resistor.

5. The explosion-proof seal plate of claim 2, additionally comprising a ring shaped positive temperature coefficient device, said device increasing in resistance upon reaching its predetermined operating temperature.

6. The explosion-proof seal plate of claim 1, in which the thin portion of the upper metallic foil is C-shaped, and the thin portion of the lower metallic foil is O-shaped.

* * * * *